US009196142B2

(12) United States Patent
Hong et al.

(10) Patent No.: US 9,196,142 B2
(45) Date of Patent: Nov. 24, 2015

(54) METHOD AND SYSTEM FOR MANAGING CONSUMPTION OF HETEROGENEOUS RESOURCES

(71) Applicant: National Taiwan Normal University, Taipei (TW)

(72) Inventors: Jon-Chao Hong, Taipei (TW); Yi-Hsuan Hung, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 211 days.

(21) Appl. No.: 14/017,033

(22) Filed: Sep. 3, 2013

(65) Prior Publication Data
US 2014/0062707 A1 Mar. 6, 2014

(30) Foreign Application Priority Data
Sep. 4, 2012 (TW) .............................. 101132145 A

(51) Int. Cl.
G08B 21/00 (2006.01)
G08B 19/00 (2006.01)
H04Q 9/00 (2006.01)

(52) U.S. Cl.
CPC .................. *G08B 19/00* (2013.01); *H04Q 9/00* (2013.01); *H04Q 2209/60* (2013.01)

(58) Field of Classification Search
CPC ..... G08B 19/00; H04Q 9/00; H04Q 2209/60; H04Q 2209/826; H04Q 2209/20
USPC .................. 340/870.01, 870.02, 657, 870.09; 700/295, 298, 276; 709/204, 238; 702/62; 705/412, 413, 7.11; 307/39
See application file for complete search history.

(56) References Cited

U.S. PATENT DOCUMENTS

| 5,543,666 A | * | 8/1996 | Priesemuth | 307/39 |
| 9,026,261 B2 | * | 5/2015 | Bukhin et al. | 700/298 |
| 2002/0178047 A1 | * | 11/2002 | Or et al. | 705/10 |
| 2010/0100253 A1 | * | 4/2010 | Fausak et al. | 700/295 |
| 2010/0106340 A1 | * | 4/2010 | Al-Mutawa | 700/295 |
| 2012/0166233 A1 | * | 6/2012 | Wengrovitz et al. | 705/7.11 |

* cited by examiner

Primary Examiner — Anh V La
(74) Attorney, Agent, or Firm — Abelman, Frayne & Schwab

(57) ABSTRACT

A method for managing consumption of heterogeneous resources includes: receiving resource consumption information of a target; calculating a total energy consumption value that is associated with the target based on the resource consumption information of the target; generating a high consumption alert when the calculated total energy consumption value is higher than a first predetermined threshold value; and generating a low consumption alert when the calculated total energy consumption value is not higher than a second predetermined threshold value that is lower than the first predetermined threshold value.

20 Claims, 4 Drawing Sheets

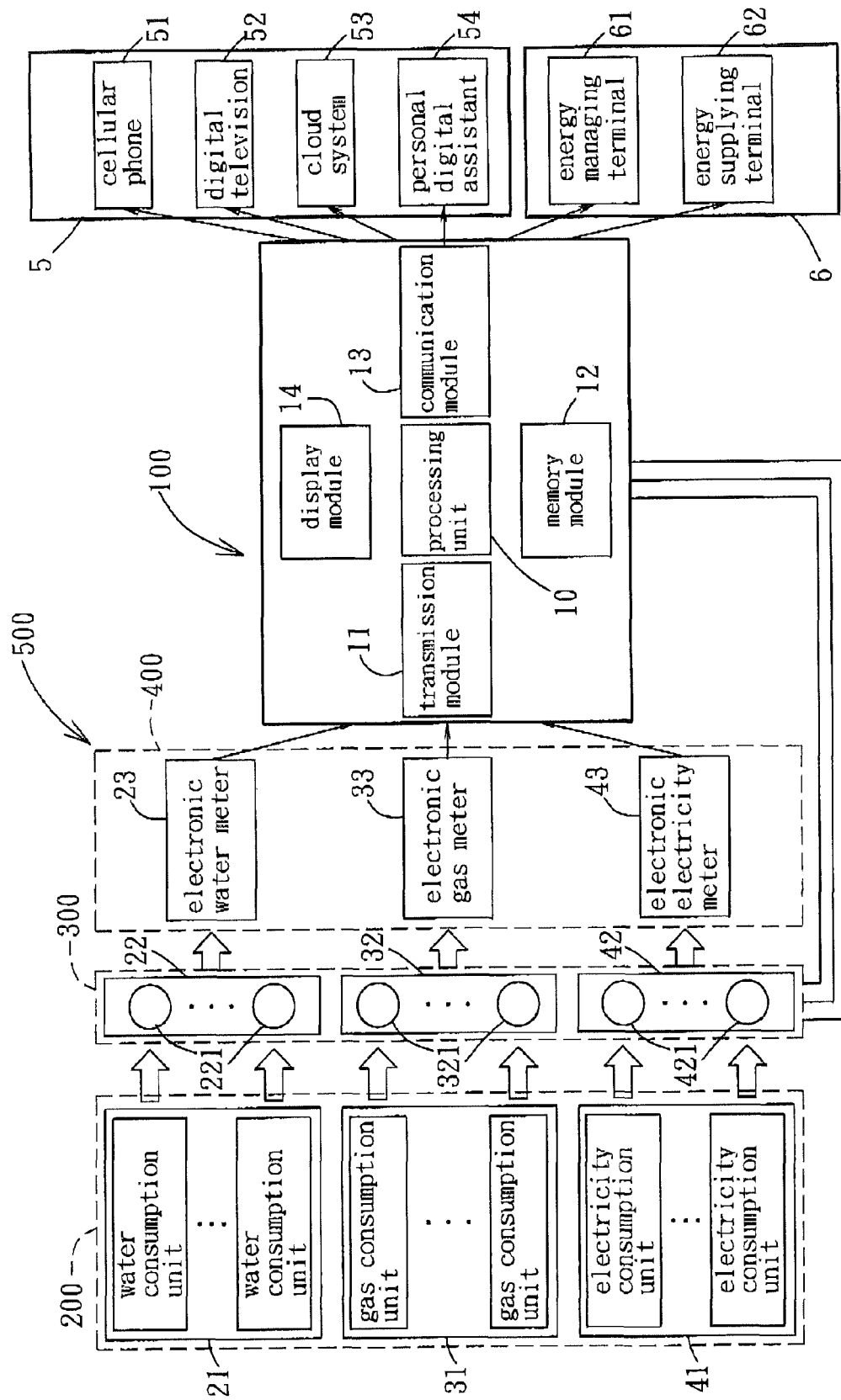
F I G. 1

METHOD AND SYSTEM FOR MANAGING CONSUMPTION OF HETEROGENEOUS RESOURCES

CROSS-REFERENCE TO RELATED APPLICATION

This application claims priority of Taiwanese application no. 101132145, filed on Sep. 4, 2012.

BACKGROUND OF THE INVENTION

1. Field of the Invention

The present invention relates to a method for managing consumption of heterogeneous resources, and a management system for implementing the method.

2. Description of the Related Art

Energy saving is to reduce the time of usage of energy resources. If a user or a group can be effective in doing so, unnecessary waste of energy can be reduced and increase of green house gases in the atmosphere would be slowed down. The problem of extreme weather change can have some improvement, reducing harm on the population due to extreme weather.

There are many ways to realize energy saving, such as using energy saving electrical equipments, using green energies, living in an energy efficient home and taking energy efficient public transportation. At present, power companies provide electricity and gas meters that measure the power and gas consumptions of individual households and companies, but a solution that alerts users of their consumption of different types of energy resources has yet to appear.

SUMMARY OF THE INVENTION

An object of the present invention is to provide a method for managing consumption of heterogeneous resources.

The method of this invention is to be implemented by a management system, and comprises:

receiving, using a transmission module of the management system, resource consumption information of a target, wherein the resource consumption information includes a plurality of data sets, each of the data sets including consumption amount data and consumption time data that are associated with a corresponding resource that is distinct from other ones of the data sets;

calculating, using a processing unit of the management system, a total energy consumption value that is associated with the target based on the resource consumption information of the target;

generating, by the management system, a high consumption alert when the total energy consumption value calculated by the processing unit is higher than a first predetermined threshold value; and generating, by the management system, a low consumption alert when the total energy consumption value calculated by the processing unit is not higher than a second predetermined threshold value that is lower than the first predetermined threshold value.

Another object of the present invention is to provide a management system for implementing the method of this invention.

The management system according to one aspect of this invention comprises:

a transmission module that is configured to receive resource consumption information of a target, wherein the resource consumption information includes a plurality of data sets, each of the data sets including consumption amount data and consumption time data that are associated with a corresponding resource that is distinct from other ones of the data sets;

a processing unit that is coupled to the transmission module and that calculates a total energy consumption value associated with the target based on the resource consumption information of the target; and an alert generating module that is coupled to the processing unit and that is configured to generate a high consumption alert when the total energy consumption value calculated by the processing unit is higher than a first predetermined threshold value, and a low consumption alert when the total energy consumption value calculated by the processing unit is not higher than a second predetermined threshold value that is lower than the first predetermined threshold value.

A further object of the present invention is to provide a management system for managing resource consumption equipment that includes a plurality of sets of heterogeneous resource consumption units, each of the sets being associated with a corresponding resource that is distinct from other ones of the sets.

The management system according to another aspect of this invention comprises:

a detection unit including a plurality of sets of heterogeneous detectors, each of the sets of heterogeneous detectors to be coupled to a respective one of the sets of heterogeneous consumption units for detecting resource consumption of the heterogeneous resource consumption units in the respective one of the sets of heterogeneous consumption units;

an electronic meter unit coupled to the detection unit for generating resource consumption information based on the resource consumption detected by the detection unit, wherein the resource consumption information includes a plurality of data sets, each of the data sets including consumption amount data associated with a corresponding resource that is distinct from other ones of the data sets; and a monitoring device coupled to the electronic meter unit for receiving the resource consumption information therefrom and for generating an alert based on the resource consumption information.

BRIEF DESCRIPTION OF THE DRAWINGS

Other features and advantages of the present invention will become apparent in the following detailed description of the preferred embodiment with reference to the accompanying drawings, of which:

FIG. 1 is a block diagram of a management system for managing consumption of heterogeneous resources according to a preferred embodiment of the present invention;

DETAILED DESCRIPTION OF THE PREFERRED EMBODIMENT

Figure 2:
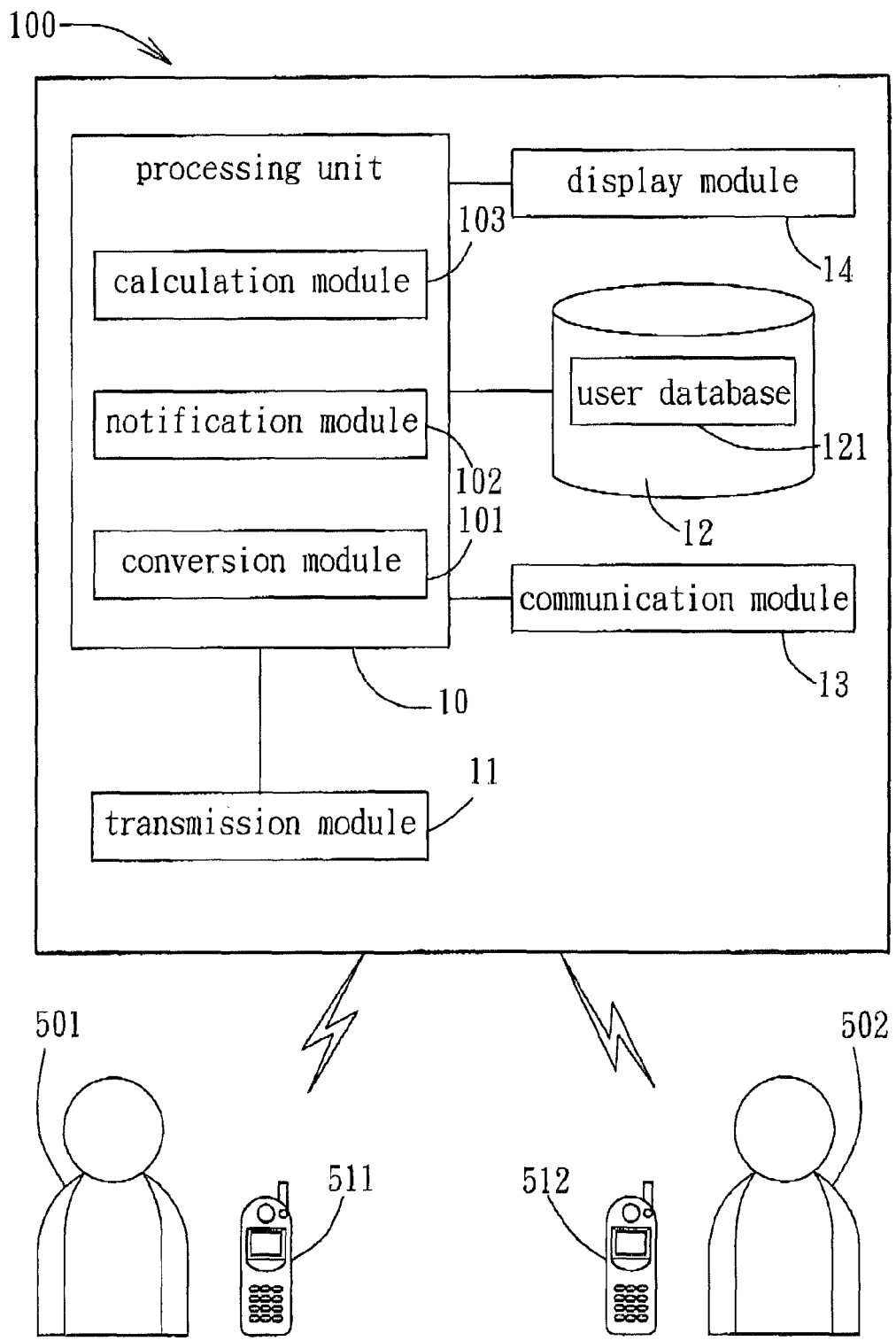
FIG. 2 is a schematic diagram illustrating a monitoring device that is able to communicate with communication devices of various users for transmitting information according to the preferred embodiment of the present invention.

Referring to FIG. 1, there is disclosed a management system 500 of a preferred embodiment of the present invention for managing resource consumption equipment 200 of a target that may include multiple individuals (e,g., households, office spaces, classrooms, etc.). The resource consumption equipment 200 includes a plurality of sets of heterogeneous resource consumption units 21, 31, 41. In this embodiment, the sets of heterogeneous resource consumption units include a set of water consumption units 21, a set of gas consumption units 31, and a set of electricity consumption units 41, but the present invention should not be limited in this respect.

The management system 500 includes a detection unit 300, an electronic meter unit 900, and a monitoring device 100.

The detection unit 300 includes a set of water usage detectors 22 to be coupled to the set of water consumption units 21 for detecting a water consumption value of each of the water consumption units 21, a set of gas usage detectors 32 to be coupled to the set of gas consumption units 31 for detecting a gas consumption value of each of the gas consumption units 31, and a set of electricity usage detectors 42 to be coupled to the set of electricity consumption units 41 for detecting an electricity consumption value of each of the electricity consumption units 41.

The electronic meter unit 400 includes an electronic water meter 23 for receiving the water consumption values and generating water consumption data based on the water consumption values, an electronic gas meter 33 for receiving the gas consumption values and generating gas consumption data based on the gas consumption values, and an electronic electricity meter 43 for receiving the electricity consumption values and generating electricity consumption data based on the electricity consumption values.

The water usage detector 22 may be a blade wheel installed at a water pipe. The water flowing through the water pipe drives the blade wheel to rotate, and the electronic water meter 23 records the cycles of rotation of each blade wheel so that a total amount of water consumption may be calculated.

The gas usage detector 32 may be a gas volume measuring device installed at a gas pipe. The gas flowing through the gas pipe drives the gas volume measuring device to rotate, and the electronic gas meter 33 records the speed of rotation of each gas volume measuring device. Since the speed of rotation is proportional to the speed of gas flow, a total amount of gas consumption may be calculated.

The electricity usage detector 42 has a plate that is driven to rotate by a magnetic field that is produced when an electric current passes through a coil. The electronic electricity meter 43 records the cycles of rotation of each plate so that a total amount of electricity consumption may be calculated.

The monitoring device 100 includes a processing unit 10, a transmission module 11, a memory module 12, a communication module 13, and a display module 14. The processing unit 10 is electrically coupled to and controls operations of the transmission module 11, the memory module 12, the communication module 13, and the display module 14. The transmission module 11 is coupled to the electronic meter unit 400 for receiving resource consumption information of different targets. The resource consumption information includes a plurality of data sets, and each of the data sets includes consumption amount data and consumption time data that are associated with a corresponding resource (water, electricity, gas, etc.) that is distinct from other ones of the data sets. The monitoring device 100 transmits to a personal electronic equipment 5 and/or a terminal equipment 6 digital information based on the resource consumption information via the communication module 13.

The personal electronic equipment 5 may be a cellular phone 51, a digital television 52, a cloud system 53 or a personal digital assistant 54 that can, according to the output of the monitoring device 100, generate a feedback control signal to control resource usage of the resource consumption equipment 200 and also generate an alert notification, thereby assisting in personal or family resource management. The terminal equipment 6 includes an energy managing terminal 61 and an energy supplying terminal 62 that can be used for remote monitoring of departments in a company and or a government agency.

Preferably, the detection unit 300 further includes a set of water control switches 221 to be coupled to the set of water consumption units 21, a set of gas control switches 321 to be coupled to the set of gas consumption units 31, and a set of electricity control switches 421 to be coupled to the set of electricity consumption units 41. The monitoring device 100 is coupled to and controls the water control switches 221, the gas control switches and the electricity control switches 421. The monitoring device 100 is configured to determine a total energy consumption value based on the water consumption data, the gas consumption data and the electricity consumption data, and to control switch states of at least one of the water control switches 221, the gas control switches 321 and the electricity control switches 421 to restrict usage of at least one of water, gas and electricity when the monitoring device 100 determines that the total energy consumption value exceeds a predetermined consumption value threshold.

In the following example, the target is chosen to be a school. However, the target can include other types of area and its users, such as companies and government agencies.

Referring to FIG. 2, the monitoring device 100 can establish communication with communication devices 511, 512 of a plurality of users 501, 502, and the communication devices 511, 512 can be electronic devices such as a computer, a mobile communication device, etc.

The memory module 12 records a user database 121 having account information corresponding to each of the users 501, 502. The account information includes a username, password and contact information. The users 501, 502 can be a citizen, a group or an institution. The account information of the users 501, 502 records the organization unit that a user belongs to in an organization, e.g., a class unit of a school.

Figure 3:
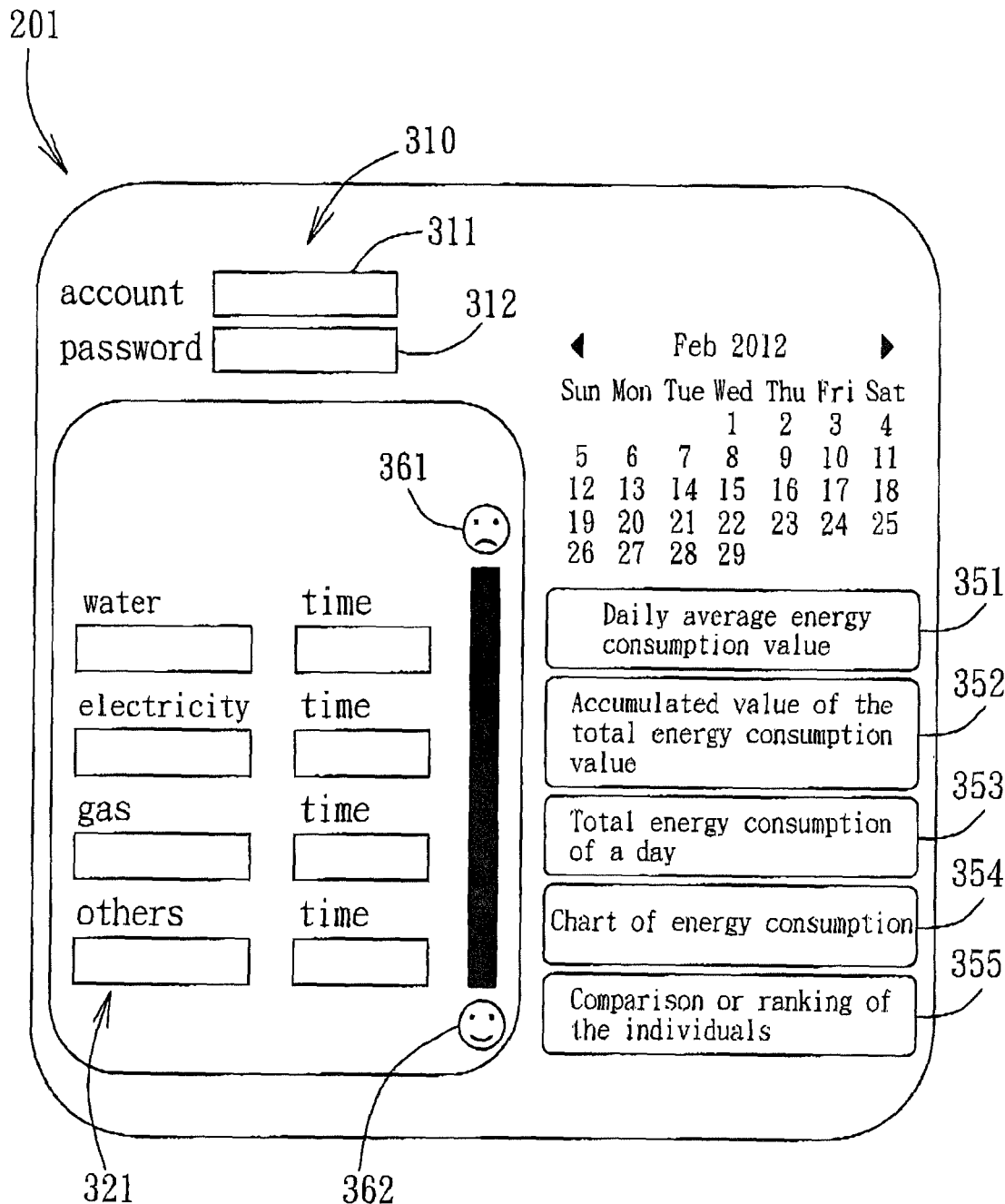
FIG. 3 is a schematic diagram illustrating a user interface for interacting with the users.

The monitoring device 100 is configured to generate a user interface 201 for interacting with the users 501, 502. An exemplary user interface 201, which may appear on the display module 14 and displays of the communication devices 511 and 512, is illustrated in FIG. 3.

The user 501, 502 may attempt to log into the monitoring device 100 by inputting account information thereof via a login area 310 having login fields 311 and 312. The inputted account information is compared with information in the user database 121 for verification. The user 501, 502 is successfully logged in when verification of the account information is completed. The user interface 201 includes a resource consumption information area 321 displaying the consumed amount of water, electricity, gas and other types of resource.

Referring to FIG. 2, the processing unit 10 is configured to include a conversion module 101, a notification module 102 and a calculation module 103. The conversion module 101 obtains the data sets included in the resource consumption information of a target, and calculates a total energy consumption value that is associated with the target based on the resource consumption information of the target using the following formula:

$$Energy_{total} = \sum_{i=1}^{n} Power_{per\_i} \times T_i;$$

$Energy_{total}$ is the total energy consumption value, $Power_{per\_i}$ is a consumption power associated with a corresponding resource (water, electricity, gas, etc.) of a particular data set, and $T_i$ represents the consumption time data of the particular data set.

The notification module 102 generates a high consumption alert, such as a sad face icon 361 in the user interface 201, when the total energy consumption value calculated by the conversion module 101 is higher than a first predetermined threshold value, and generates a low consumption alert, such as a happy face icon 362 in the user interface 201, when the total energy consumption value calculated by the conversion module 101 is not higher than a second predetermined threshold value that is lower than the first predetermined threshold value.

The calculation module 103 performs a management operation for managing an account of the target based on the total energy consumption value of the target. The management operation includes plotting a chart of the total energy consumption value with respect to time (e.g., showing a chart of daily energy consumption over a week in an energy information area 354), obtaining an average of the total energy consumption value over a period of time (e.g., showing a daily average energy consumption value in an energy information area 351 by dividing the total energy consumption value of a week by seven), and obtaining an accumulated value of the total energy consumption value over a period of time (e.g., showing a total energy consumption value of a week or day in energy information areas 352, 353, respectively). When the target includes multiple individuals that have respective resource consumption information, such as classes in a school, the management operation may further include comparing the accounts of the individuals for resource consumption analysis, and ranking the individuals according to the total energy consumption values of the individuals as calculated by the calculation module 103 (e.g., comparing or ranking the classes in the school according to the total energy consumption value of each class, and showing the comparison or ranking in an energy information area 355 to provide motivation for students in those classes to compete in saving energy).

In other embodiments, the management operation may include plotting a chart of the consumption amount data of at least one of the data sets with respect to time, obtaining an average of the consumption amount data of at least one of the data sets over a period of time, and obtaining an accumulated value of the consumption amount data of at least one of the data sets over a period of time.

Figure 4:
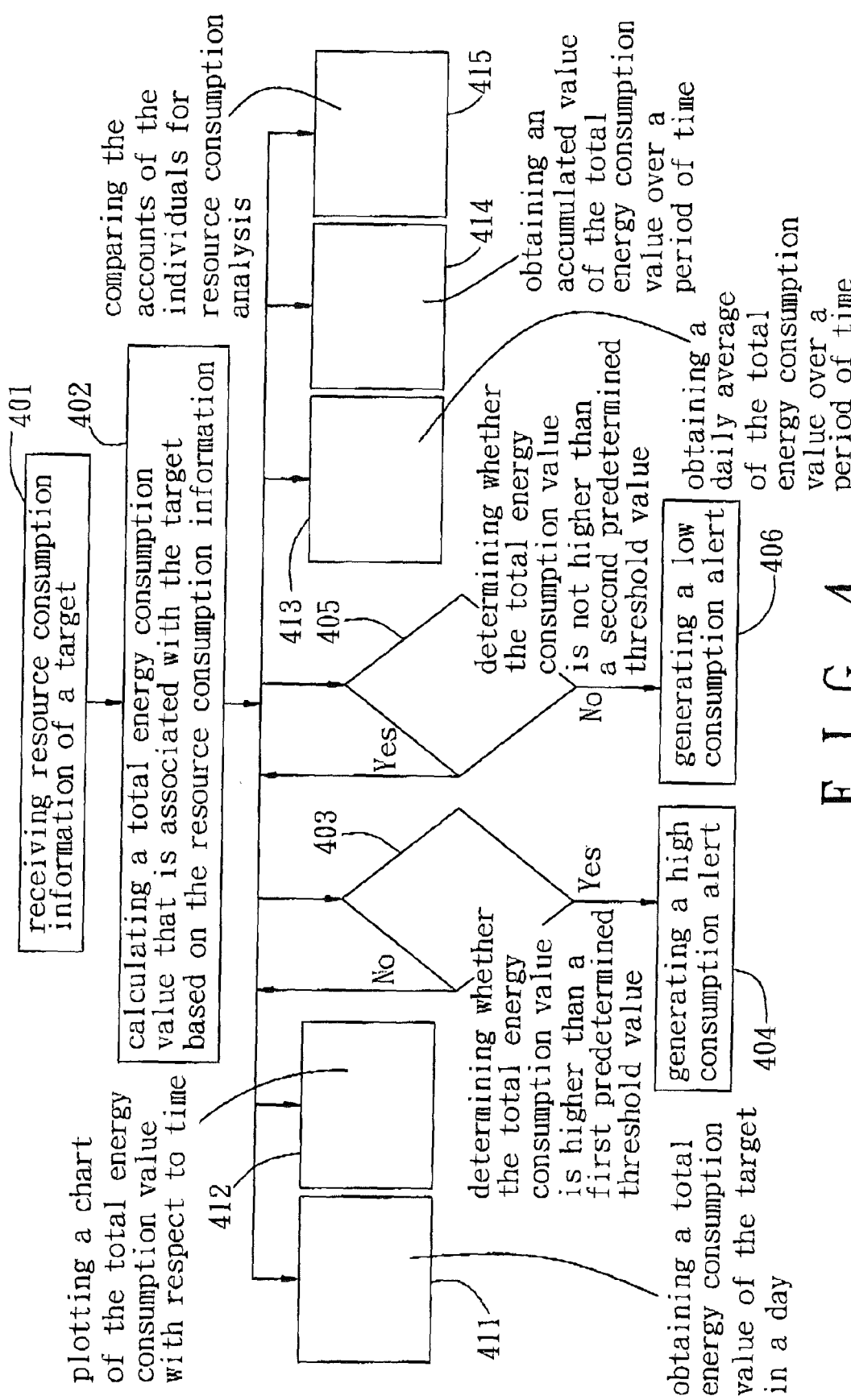
FIG. 4 is a flow chart illustrating a method for managing consumption of heterogeneous resources according to the preferred embodiment of the present invention.

Referring to FIGS. 2 and 4, a method for managing consumption of heterogeneous resources, which is to be implemented by the monitoring device 100, includes the following steps:

step 401: using the transmission module 11 of the monitoring device 100 to receive resource consumption information of a target. The resource consumption information includes a plurality of data sets, and each of the data sets includes consumption amount data and consumption time data that are associated with a corresponding resource (i.e., water, gas or electricity) that is distinct from other ones of the data sets.

step 402: using the processing unit 10 of the monitoring device 100 to calculate a total energy consumption value that is associated with the target based on the resource consumption information of the target.

step 403: the monitoring device 100 determines whether the total energy consumption value calculated by the processing unit 10 is higher than a first predetermined threshold value.

step 404: if the total energy consumption value is higher than a first predetermined threshold value, the monitoring device 100 generates a high consumption alert.

step 405: the monitoring device 100 determines whether the total energy consumption value calculated by the processing unit 10 is not higher than a second predetermined threshold value that is lower than the first predetermined threshold value.

step 406: if the total energy consumption value is not higher than a second predetermined threshold value, the monitoring device 100 generates a low consumption alert.

Preferably, the method further includes performing, using the processing unit 10 of the monitoring device 100, a management operation for managing an account of the target based on the total energy consumption value of the target. The management operation includes the following steps:

step 411: obtaining a total energy consumption value of the target in a day.

step 412: plotting a chart of the total energy consumption value with respect to time;

step 413: obtaining a daily average of the total energy consumption value over a period of time;

step 414: obtaining an accumulated value of the total energy consumption value over a period of time; and step 415: comparing the accounts of the individuals for resource consumption analysis, and ranking the individuals according to the total energy consumption values of the individuals as calculated by the processing unit 10.

To sum up, embodiment of this invention has a number of effects. For example, by the management system monitoring the resource consumption information associated with a corresponding resource such as water, gas and electricity, the information of individual resource consumption's is feed to the target. Thus, the target maybe able to have a more concrete understanding about one's resource consumption and subsequently awareness about global warming. Further, the system 100 is able to determine the total energy consumption value that is associated with the target, and to generate corresponding alerts when the total energy consumption value is deemed excessive or favorably low.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for managing consumption of heterogeneous resources, the method to be implemented by a management system, the method comprising:

receiving, using a transmission module of the management system, resource consumption information of a target, wherein the resource consumption information includes a plurality of data sets, each of the data sets including consumption amount data and consumption time data that are associated with a corresponding resource that is distinct from other ones of the data sets;

calculating, using a processing unit of the management system, a total energy consumption value that is associated with the target based on the resource consumption information of the target;

generating, by the management system, a high consumption alert when the total energy consumption value calculated by the processing unit is higher than a first predetermined threshold value; and generating, by the management system, a low consumption alert when the total energy consumption value calculated by the processing unit is not higher than a second predetermined threshold value that is lower than the first predetermined threshold value.

2. The method as claimed in claim 1, further comprising:
performing, using the processing unit of the management system, a management operation for managing an account of the target based on the total energy consumption value of the target, wherein the management operation includes at least one of plotting a chart of the total energy consumption value with respect to time, obtaining an average of the total energy consumption value over a period of time, and obtaining an accumulated value of the total energy consumption value over a period of time.

3. The method as claimed in claim 1, further comprising:
performing, using the processing unit of the management system, a management operation for managing an account of the target based on the resource consumption information of the target, wherein the management operation includes at least one of plotting a chart of the consumption amount data of at least one of the data sets with respect to time, obtaining an average of the consumption amount data of at least one of the data sets over a period of time, and obtaining an accumulated value of the consumption amount data of at least one of the data sets over a period of time.

4. The method as claimed in claim 1, the target including multiple individuals that have respective resource consumption information, said method further comprising:
performing, using the processing unit of the management system, a management operation for managing an account of each of the individuals based on the respective total energy consumption values of the individuals, wherein the management operation includes at least one of plotting a chart of the total energy consumption value with respect to time, obtaining an average of the total energy consumption value over a period of time, and obtaining an accumulated value of the total energy consumption value over a period of time.

5. The method as claimed in claim 4, wherein the management operation further includes at least one of comparing the accounts of the individuals for resource consumption analysis, and ranking the individuals according to the total energy consumption values of the individuals as calculated by the processing unit.

6. The method as claimed in claim 1, the target including multiple individuals that have respective resource consumption information, said method further comprising:
performing, using the processing unit of the management system, a management operation for managing an account of each of the individuals based on the respective resource consumption information of the individuals, wherein the management operation includes at least one of plotting a chart of the consumption amount data of at least one of the data sets with respect to time, obtaining an average of the consumption amount data of at least one of the data sets over a period of time, and obtaining an accumulated value of the consumption amount data of at least one of the data sets over a period of time.

7. The method as claimed in claim 6, wherein the management operation further includes at least one of comparing the accounts of the individuals for resource consumption analysis, and ranking the individuals according to the total energy consumption values of the individuals as calculated by the processing unit.

8. The method as claimed in claim 1, wherein the data sets of the resource consumption information correspond respectively to water consumption, gas consumption and electricity consumption.

9. A management system for managing consumption of heterogeneous resources, said management system comprising:
a transmission module that is configured to receive resource consumption information of a target, wherein the resource consumption information includes a plurality of data sets, each of the data sets including consumption amount data and consumption time data that are associated with a corresponding resource that is distinct from other ones of the data sets;
a processing unit that is coupled to said transmission module and that calculates a total energy consumption value associated with the target based on the resource consumption information of the target; and
an alert generating module that is coupled to said processing unit and that is configured to generate a high consumption alert when the total energy consumption value calculated by said processing unit is higher than a first predetermined threshold value, and a low consumption alert when the total energy consumption value calculated by said processing unit is not higher than a second predetermined threshold value that is lower than the first predetermined threshold value.

10. The management system as claimed in claim 9, wherein said processing unit is configured to perform a management operation for managing an account of the target based on the total energy consumption value of the target, the management operation including at least one of plotting a chart of the total energy consumption value with respect to time, obtaining an average of the total energy consumption value over a period of time, and obtaining an accumulated value of the total energy consumption value over a period of time.

11. The management system as claimed in claim 9, wherein said processing unit is configured to perform a management operation for managing an account of the target based on the resource consumption information of the target, the management operation including at least one of plotting a chart of the consumption amount data of at least one of the data sets with respect to time, obtaining an average of the consumption amount data of at least one of the data sets over a period of time, and obtaining an accumulated value of the consumption amount data of at least one of the data sets over a period of time.

12. The management system as claimed in claim 9, the target including multiple individuals that have respective resource consumption information, wherein said processing unit is configured to perform a management operation for managing an account of each of the individuals based on the respective total energy consumption values of the individuals, the management operation including at least one of plotting a chart of the total energy consumption value with respect to time, obtaining an average of the total energy consumption value over a period of time, and obtaining an accumulated value of the total energy consumption value over a period of time.

13. The management system as claimed in claim 12, wherein the management operation further includes at least one of comparing the accounts of the individuals for resource consumption analysis, and ranking the individuals according to the total energy consumption values of the individuals as calculated by the processing unit.

14. The management system as claimed in claim 9, the target including multiple individuals that have respective resource consumption information, wherein said processing unit is configured to perform a management operation for managing an account of each of the individuals based on the respective resource consumption information of the individuals, the management operation including at least one of plotting a chart of the consumption amount data of at least one of the data sets with respect to time, obtaining an average of the consumption amount data of at least one of the data sets over a period of time, and obtaining an accumulated value of the consumption amount data of at least one of the data sets over a period of time.

15. The management system as claimed in claim 14, wherein the management operation further includes at least one of comparing the accounts of the individuals for resource consumption analysis, and ranking the individuals according to the total energy consumption values of the individuals as calculated by the processing unit.

16. The management system as claimed in claim 9, wherein the data sets of the resource consumption information correspond respectively to water consumption, gas consumption and electricity consumption.

17. A management system for managing resource consumption equipment that includes a plurality of sets of heterogeneous resource consumption units, each of the sets being associated with a corresponding resource that is distinct from other ones of the sets, said management system comprising:
   a detection unit including a plurality of sets of heterogeneous detectors, each of the sets of heterogeneous detectors to be coupled to a respective one of the sets of heterogeneous consumption units for detecting resource consumption of the heterogeneous resource consumption units in the respective one of the sets of heterogeneous consumption units;
   an electronic meter unit coupled to said detection unit for generating resource consumption information based on the resource consumption detected by said detection unit, wherein the resource consumption information includes a plurality of data sets, each of the data sets including consumption amount data associated with a corresponding resource that is distinct from other ones of the data sets; and
   a monitoring device coupled to said electronic meter unit for receiving the resource consumption information therefrom and for generating an alert based on the resource consumption information.

18. The management system as claimed in claim 17, the sets of heterogeneous resource consumption units including a set of water consumption units, a set of gas consumption units, and a set of electricity consumption units, wherein:
   the sets of heterogeneous detectors of the detection unit include a set of water usage detectors to be coupled to the set of water consumption units for detecting a water consumption value of each of the water consumption units, a set of gas usage detectors to be coupled to the set of gas consumption units for detecting a gas consumption value of each of the gas consumption units, and a set of electricity usage detectors to be coupled to the set of electricity consumption units for detecting an electricity consumption value of each of the electricity consumption units; and
   the electronic meter unit includes an electronic water meter for receiving the water consumption values and generating water consumption data based on the water consumption values, an electronic gas meter for receiving the gas consumption values and generating gas consumption data based on the gas consumption values, and an electronic electricity meter for receiving the electricity consumption values and generating electricity consumption data based on the electricity consumption values;
   the water consumption data serving as the consumption amount data of one of the data sets, the gas consumption data serving as the consumption amount data of another one of the data sets, the electricity consumption data serving as the consumption amount data of yet another one of the data sets.

19. The management system as claimed in claim 18, wherein said detection unit further includes a set of water control switches to be coupled to the set of water consumption units, a set of gas control switches to be coupled to the set of gas consumption units, and a set of electricity control switches to be coupled to the set of electricity consumption units,
   said water control switches, said gas control switches and said electricity control switches being coupled to said monitoring device,
   said monitoring device being configured to determine a total energy consumption value based on the water consumption data, the gas consumption data and the electricity consumption data, and to control switch states of at least one of said water control switches, said gas control switches and said electricity control switches to restrict usage of at least one of water, gas and electricity when said monitoring device determines that the total energy consumption value exceeds a predetermined consumption value threshold.

20. The management system as claimed in claim 18, wherein said monitoring device includes:
   a display module;
   a transmission module coupled to said electronic meter unit for receiving the resource consumption information from said electronic meter unit; and
   a processing unit coupled to said transmission module and said display module, and configured to receive the resource consumption information from said transmission module, said processing unit storing a first predetermined threshold value and a second predetermined threshold value that is lower than the first predetermined threshold value and being configured to calculate a total energy consumption value based on the resource consumption information;
   said processing unit configuring said display module to generate a high consumption alert when the total energy consumption value calculated by said processing unit is higher than the first predetermined threshold value, and to generate a low consumption alert when the total energy consumption value calculated by said processing unit is not higher than the second predetermined threshold value.

* * * * *